United States Patent
Childs

(10) Patent No.: US 9,379,610 B2
(45) Date of Patent: Jun. 28, 2016

(54) BUCK VARIABLE NEGATIVE CURRENT

(71) Applicant: Dialog Semiconductor GmbH, Kirchheim/Teck-Nabern (DE)

(72) Inventor: Mark Childs, Swindon (GB)

(73) Assignee: Dialog Semiconductor (UK) Limited, Reading (GB)

( * ) Notice: Subject to any disclaimer, the term of this patent is extended or adjusted under 35 U.S.C. 154(b) by 139 days.

(21) Appl. No.: 14/260,523

(22) Filed: Apr. 24, 2014

(65) Prior Publication Data

US 2015/0303801 A1     Oct. 22, 2015

(30) Foreign Application Priority Data

Apr. 16, 2014   (EP) .................................... 14392005

(51) Int. Cl.
  *H02M 3/158* (2006.01)
  *H02M 1/32* (2007.01)
  *H02M 1/00* (2006.01)
(52) U.S. Cl.
  CPC ................ *H02M 3/158* (2013.01); *H02M 1/32* (2013.01); *H02M 3/1588* (2013.01); *H02M 2001/0032* (2013.01); *Y02B 70/1466* (2013.01); *Y02B 70/16* (2013.01)
(58) Field of Classification Search
  CPC  H02M 3/158; H02M 1/32; H02M 2001/0032
  USPC ........................ 323/271, 272, 282, 284–290
  See application file for complete search history.

(56) References Cited

U.S. PATENT DOCUMENTS

| | | | |
|---|---|---|---|
| 6,911,809 B2 | 6/2005 | Kernahan | |
| 7,095,220 B2 | 8/2006 | Kernahan | |
| 7,365,661 B2 | 4/2008 | Thomas | |
| 7,443,699 B2 | 10/2008 | Lhermite | |
| 7,652,461 B2 * | 1/2010 | Tateishi | ............. H02M 3/1588 323/284 |
| 8,222,879 B2 * | 7/2012 | Nguyen | .................... G05F 1/56 323/282 |
| 2003/0112568 A1 | 6/2003 | Holt et al. | |
| 2006/0119340 A1 | 6/2006 | Tateishi | |
| 2006/0279970 A1 | 12/2006 | Kernahan | |

OTHER PUBLICATIONS

European Search Report 14392005.6-1809, Oct. 16, 2014, Dialog Semiconductor GmbH.
Co-pending US Patent DS12-050, U.S. Appl. No. 14/260,516, File Date Apr. 24, 2014, "Negative Current Clocking," by Mark Childs, et al., 24 pgs.

* cited by examiner

*Primary Examiner* — Yemane Mehari
(74) *Attorney, Agent, or Firm* — Saile Ackerman LLC; Stephen B. Ackerman

(57) ABSTRACT

An active diode formed within a buck power regulator with an NMOS transistor is connected to a PMOS transistor at a node that is further connected to the regulator output through an inductor. The active diode combines the NMOS transistor with circuitry to prevent conduction once the active diode passes a threshold voltage. Additional circuitry compares the output voltage to the target input voltage and varies the threshold voltage of the active diode such that the active diode can discharge excess current from the regulator each cycle until the output voltage is less than the target voltage.

11 Claims, 3 Drawing Sheets

BUCK VARIABLE NEGATIVE CURRENT

TECHNICAL FIELD

The present disclosure is related to power sources and in particular to switching mode power supplies comprising buck type regulators

BACKGROUND

A switching mode power supply (SMPS) converts power from a source, for instance Vdd, on an integrated circuit chip into a voltage or current to be used to power a portion of the circuits on that integrated circuit chip. Switching mode power supplies comprise buck, boost and buck-boost power converters. The buck converter stores energy into an inductor and provides an output voltage that is a result of the reluctance of the inductor to change current flowing in the inductor. The boost converter stores energy into an inductor and provides an output greater than source voltage and the buck-boost converter produces an output that is either higher or lower than the source voltage.

The buck power converter generates a pulse width modulated (PWM) switching voltage at the LX node shown in FIG. 1, which is then filtered by an inductor L1. Generally, buck converters operate in one of two modes, PWM mode at a fixed frequency, or pulse frequency modulation (PFM) mode where the frequency is allowed to change with load current.

Typically the PFM mode is used for low-power operation and can be highly efficient. In the PFM mode, the PMOS transistor P1 is typically turned on when the output voltage falls below a low threshold. The PMOS transistor is then turned off when the current in the inductor rises above a fixed limit, or if the output voltage rises above an upper threshold. When the PMOS transistor P1 is turned off the current in the inductor L1 continues to flow, until the inductor is discharged. This current must be supplied from ground. This can be done using a diode, but the voltage drop across the diode reduces the efficiency of the buck converter. Therefore, most high efficiency buck converters use an NMOS transistor N1, directly controlled by the buck control circuitry, and when the PMOS transistor P1 turns off, the NMOS transistor N1 is turned on.

If the load is low, the buck may only need to switch to at a low frequency to supply the output current. If the NMOS transistor is left on until the PMOS transistor is triggered again, the current in the inductor will go negative, the NMOS transistor will end up discharging the output of the buck converter and power will be wasted. Instead the NMOS transistor is turned off once the current in the inductor reaches zero current, which is typically referred to as an active diode behavior. In one common implementation of a buck converter, the active diode function is implemented by measuring the voltage across the NMOS transistor. If the voltage at the LX node is negative, the current is still positive, and the NMOS transistor is kept on. But once the voltage at the LX node goes above ground, the NMOS transistor is turned off.

US 2006/0279970 A1 (Kernahan) is directed to control system and method for simultaneously regulating the operation of a plurality of different types of switching power regulators including not having the regulator feeding current back to the supply. U.S. Pat. No. 8,222,879 B2 (Nguyan) is directed to a circuit that includes a buck voltage regulator couple to an active current modulator, which is operative to detect negative current in the low side switch of the voltage regulator. In U.S. Pat. No. 7,443,699 B2 (Lhermite) is directed to a power supply controller that uses a negative current of a power transistor to detect a point for enabling the power transistor when driving an inductor. In U.S. Pat. No. 7,365,661 B2 (Thomas) a control system and method is directed to simultaneously regulating the operation of a plurality of different types of switching power converters. In U.S. Pat. No. 7,095,220 B2 (Kernahan) a method is directed to controlling an operation of a switching power converter which includes a first and second series connected transistors and including the handling of "negative" current flow. U.S. Pat. No. 6,911,809 B2 (Kernahan) is directed to a controller configured to control the pulse widths of a plurality of pulse width modulated switching power supplies, wherein a discontinuous operation, current is not fed back to the supply from the inductor.

SUMMARY

It is an objective of the present disclosure to control the NMOS transistor to permit "negative" current to pass in the event that the output voltage rises too high.

It is also an objective of the present disclosure to vary the amount of "negative" current that may pass through the NMOS transistor in proportion to the error of the output voltage.

It is further an objective of the present disclosure to establish a small offset to prevent normal output ripple from causing the NMOS transistor from passing "negative" current.

The buck power regulator of the present disclosure is formed by a PMOS transistor and an NMOS transistor connected together between Vdd and circuit ground or Vss. A node LX is formed at the connection between the NMOS and PMOS transistors. The LX node is also connected to an inductor L1, which is coupled to the output of the buck power regulator, and to a zero crossing comparator, which in turn is connected to one input of an AND circuit that drives the gate of the NMOS transistor, or active diode. The other input to the AND circuit is connected to the gate of the PMOS transistor, which provides input current to the inductor.

The zero crossing comparator monitors the voltage across the NMOS transistor, and when the voltage goes from negative to positive, the current flowing through the NMOS transistor has changed direction from a current flowing from ground into the inductor to a current flowing from the inductor into ground, called "negative current". The zero crossing comparator senses the change in voltage across the NMOS transistor, which signifies a change in the direction of current flow, and turns off the NMOS transistor. Since the positive input of the zero crossing comparator is connected to ground and the negative input is connected to the LX node, the voltage across the NMOS transistor will be negative as measured by the zero crossing comparator when current is flowing from circuit ground through the comparator into the LX node and therefore into the inductor.

The term "negative current" is used to describe the direction of current flow through the NMOS transistor, wherein the NMOS transistor is also known as an active diode. The NMOS transistor is designated as an active diode because under ideal situation the NMOS is turned off when current from circuit ground flowing into the buck power regulator ends. Thus the NMOS transistor is controlled operate similar to a diode.

In the present disclosure a comparator, or an amplifier, with an input connected to the target voltage of the buck power regulator and a feedback voltage from the output of the buck power regulator is used to provide the positive input to the zero crossing comparator. When the amplifier is used instead of the comparator, a continuously varying active diode threshold is applied to the NMOS transistor, which governs the amount of "negative current" that is allowed to pass from the inductor to circuit ground and discharges a higher overvoltage with a higher "negative current"

BRIEF DESCRIPTION OF THE DRAWINGS

This invention will be described with reference to the accompanying drawings, wherein.

DETAILED DESCRIPTION

Figure 1:
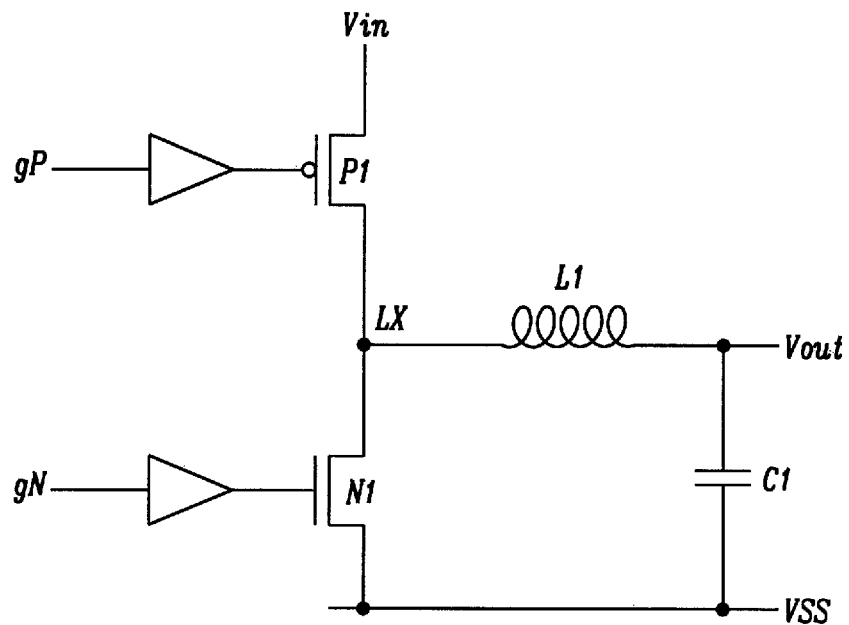
FIG. 1 is a circuit diagram of the basic buck power regulator of prior art.
Figure 2:
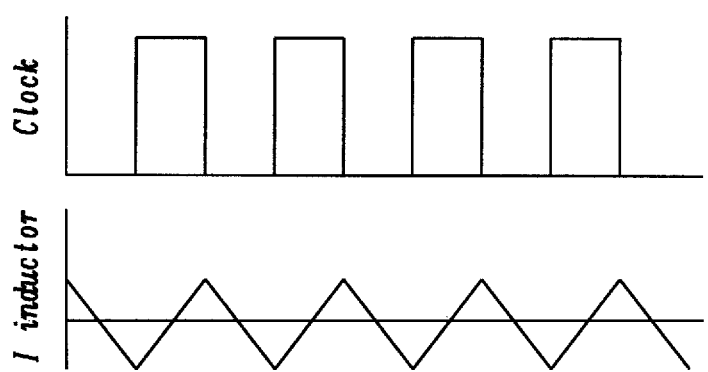
FIG. 2 is a diagram of the clock and the inductor current in a PWM (pulse width modulation) buck power regulator of the present disclosure.

In FIG. 2 is shown the clock that is applied to input signal of the PMOS transistor of the buck power regulator operating in PWM (pulse width modulation) mode of the present disclosure and the resulting inductor current. When there is a clock pulse, the PMOS transistor conducts and supplies a current (raising current signal) to the inductor of the buck power regulator. When the clock pulse is terminated, the NMOS transistor is turned on and current continues to flow (falling current signal) into the inductor from ground until the current stored in the inductor is depleted, at which time the NMOS transistor is turned off to prevent excess current to flow into the inductor from circuit ground. If there is no load on the power regulator the current as shown in the I inductor diagram will vary around ground.

Figure 3:
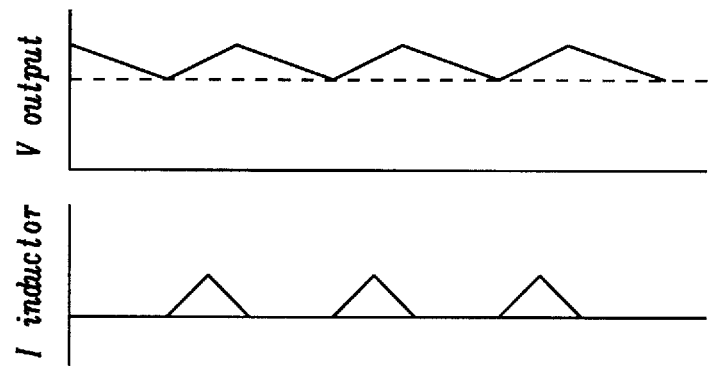
FIG. 3 is a diagram of the output voltage and inductor current in a PFM (pulse frequency modulation) buck power regulator of the present disclosure.

In FIG. 3 is shown the output voltage and inductor current for a buck power regulator operating in PFM (pulse frequency modulated) mode. In the PFM mode the output goes into high impedance mode once the PMOS transistor of the buck regulator has delivered an amount of charge to the output. Both the PMOS and NMOS transistors remain off until the load has discharged the load to the threshold that is required for the PMOS transistor to be turned on again. When the PMOS transistor is turned on, an amount of current is delivered by the PMOS transistor to the Inductor as demonstrated in the rise in inductor current. The current into the inductor continues to flow once the PMOS transistor turns off through the NMOS transistor turns as demonstrated in the fall of the inductor current. Since the buck regulator operating in the PFM mode does not pass "negative current" and only switches when required, a high efficiency can be achieved at low output currents while operating in the PFM mode.

The key disadvantage of this system is that the buck regulator cannot discharge its output if for any reason the output goes into overvoltage. This leads to complex control systems that require a PWM mode for high loads and for dynamically changing output voltages, but then switching to PFM for low load conditions. These schemes require sensing systems to decide which mode to operate in. There is therefore a large benefit to any system that can fully regulate in PFM mode.

Figure 4:
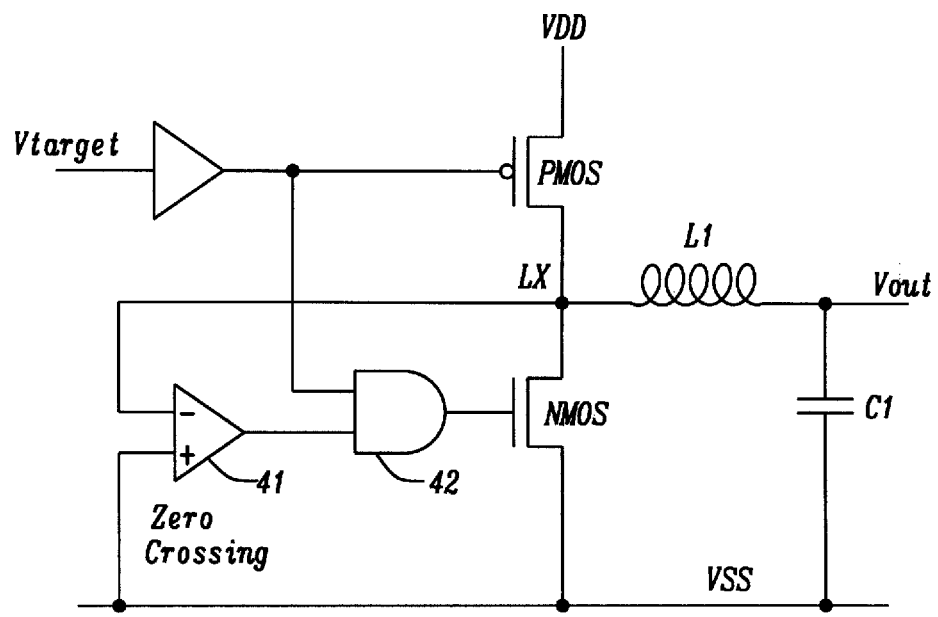
FIG. 4 is a diagram of a zero crossing monitoring circuit of the NMOS trasnsistor of the buck power regulator of the present disclosure.

In FIG. 4 is shown circuitry to monitor and prevent "negative current" flowing from the output of the buck power regulator to circuit ground. This is accomplished by detecting when the voltage across the NMOS transistor reverses polarity, which signifies a reversal in direction of current flow to current flowing from the buck regulator to circuit ground, called "negative current". The NMOS transistor is turned off by the AND circuit 42 when a zero crossing is detected. When the direction of current flow in the NMOS transistor changes direction, the voltage across the NMOS also changes polarity. Detecting this change in voltage polarity is accomplished by the zero crossing detector 41 in which the negative input terminal of the detector is connected to the LX node and the positive input terminal is connected to circuit ground. The output of the zero crossing detector is coupled to one input of an AND circuit 42, wherein the second input to the AND circuit 42 is coupled to the input of the PMOS transistor. Thus when the PMOS is not being driven by a signal and a voltage change across the NMOS transistor is detected by the zero crossing detector 41, the NMOS transistor is turned off.

Figure 5:
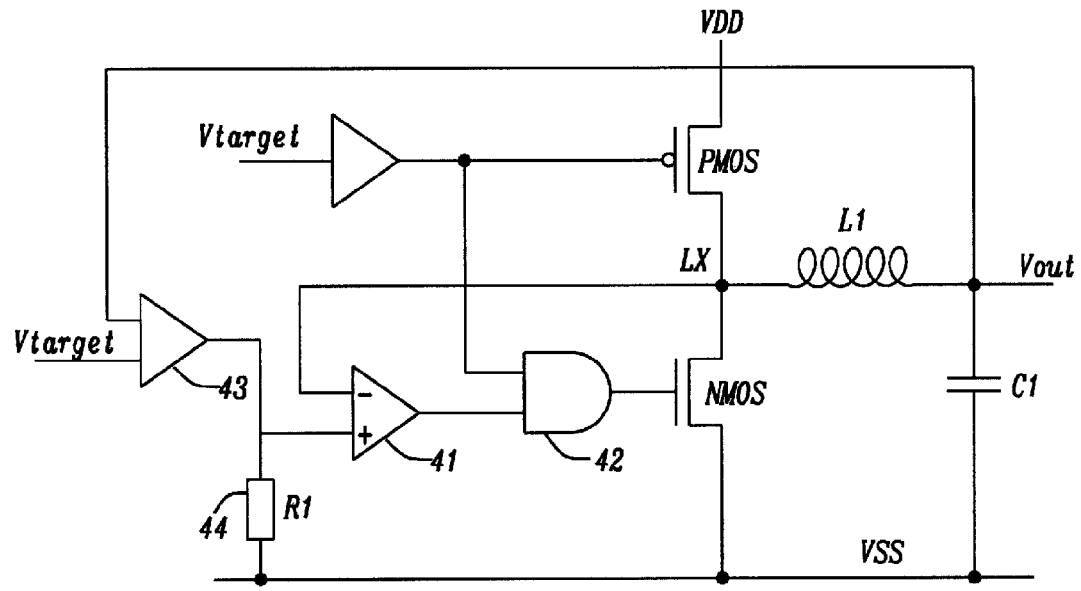
FIG. 5 is circuit a diagram that allows excess current in the bunch power regulator to be discharged to ground before the NMOS transistor is turned off.

In FIG. 5 a comparator 43 compares the output voltage, Vout, of the buck regulator to the input voltage, Vtarget. Vtarget is usually established by a DAC, but any analog voltage source can be used to provide a target for the output voltage of the buck regulator. The output of the comparator 43 causes a voltage drop across the R1 resistor 44 that is connected to the positive input of the zero crossing comparator 41. This compares the voltage at the LX node to another voltage instead of circuit ground shown in FIG. 4, and the current at which the NMOS transistor turns off can be varied.

When the output of the zero crossing comparator switches voltage polarity, the current in the NMOS transistor has switched from current flowing from circuit ground (Vss) into the buck regulator to current flowing from the buck regulator into circuit ground (called negative current) and the NMOS transistor is turned off by the AND circuit 42. Thus excess charge builds up on the output of the buck regulator circuit with no place to discharge the stored charge from the regulator. A combining circuit 43 taking the form of a comparator, compares the output voltage to the input voltage and creates a current that flows through resistor R1 43 that allows the threshold of zero crossing comparator 41 to raise an amount to permit some of the excess current that has built up in the buck regulator to be conducted each cycle by the NMOS transistor to Vss, or circuit ground. If each time the NMOS transistor is turned on a small amount of excess current is bled away efficiency of the buck regulator is reduced. This inefficiency can be somewhat negated by implementing a small dead zone so that a small error at the buck regulator output does not cause an offset to be added to the active diode threshold. An alternative to the combining circuit being a comparator circuit is for the combining circuit to be an amplifier, wherein the amount of current that can be discharged to circuit ground is proportional to the amount of overvoltage present at the output of the regulator. In either case, the combining circuit using, either a comparator or an amplifier, provides a mechanism to discharge excess current to circuit ground.

Figure 6:
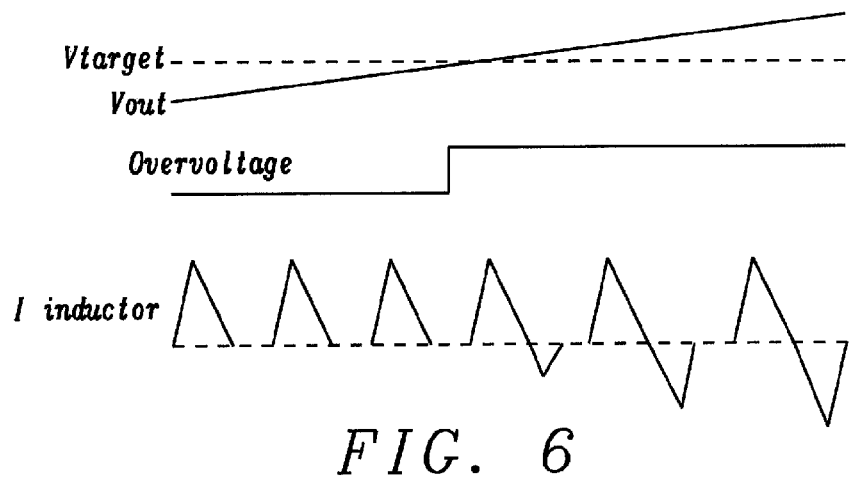
FIG. 6 is a signal diagram of the present disclosure that shows the build up of current in the inductor when output voltage is larger than the target voltage.

In FIG. 6 is shown the build up of current in the inductor, I inductor. When Vtarget is larger than Vout, the triangular shaped current pulses are formed by the inductor current, first as the PMOS transistor conducts current (raising waveform) from Vdd into the inductor L1 and then as the NMOS transistor continues to conduct current (falling waveform) into the inductor from circuit ground, Vss. Then there is no current until the next time the PMOS transistor is turned on in the next cycle. When an overvoltage is detected, Vout becomes higher than Vtarget, and the inductor L1 conducts excess current from the inductor to Vss, called "negative current". If the NMOS transistor becomes an active diode and is turned off when zero crossing is detected, then the output voltage will continue to rise and the excess charge in the regulator will not be discharged without the operation of the comparator 43 shown in FIG. 5. Vout becomes larger than Vtarget and is compared together in comparator 43, which produces a current through resistor R1 that forms a voltage drop that is coupled to the positive input to the zero crossing comparator. Thus the voltage at node LX (across the NMOS transistor) is allowed to raise by the amount of voltage across R1 and the NMOS transistor is kept on a little longer to discharge some of the excess current in the inductor to circuit ground. If the comparator 43 is an amplifier instead, then the active diode formed by the NMOS transistor and the zero crossing circuitry will have a continuously varying threshold voltage to discharge excess current from the buck regulator and bring the output voltage back in line with the target voltage.

It should be noted that it is within the scope of the present disclosure to use a fixed voltage offset, including circuit ground (zero volts), to replace the operations and results of the circuitry related to the combining circuit shown in FIG. 5. It is also within the scope of the present disclosure that the fixed voltage offset, including circuit ground, can be switched on or off as needed to discharge excess current to circuit ground.

While the invention has been particularly shown and described with reference to preferred embodiments thereof, it will be understood by those skilled in the art that various changes in form and details may be made without departing from the spirit and scope of the invention.

What is claimed is:

1. A switching mode power supply (SMPS), comprising:
    a) a buck power regulator comprising a high-side PMOS pass transistor and a low side active diode;
    b) the low-side active diode capable of continuously varying a threshold voltage;
    c) a circuitry configured to control the threshold voltage of the active diode, comprising:
        a first comparison circuit configured to compare a voltage representing an output voltage of the buck converter with a reference voltage, wherein an output of the first comparison circuit is connected to a first terminal of a circuit having resistance and to a first input of a second comparison circuit;
        said circuit having resistance, wherein a second terminal of the circuit having resistance is connected to ground, wherein a resistance of the circuit having resistance is capable of determining a threshold of the second comparison circuit permitting some of an excess current that has built up in the buck regulator to be conducted each cycle by the low-side active diode to Vss, or circuit ground;
        said second comparison circuit, configured to detect a zero crossing of a voltage of a node (LX) located between the PMOS pass transistor and the active diode, wherein a second input of the second comparison circuit is connected to the LX node and an output of the second comparison circuit is connected to a first input of a logic AND circuit; and
        said logic AND circuit capable of turning off the low-side active diode if the high side PMOS pass transistor is not being driven by a signal and a voltage change across the low-side active diode is detected by the second comparison circuit, wherein an output of the AND circuit is connected to a gate of the low-side active diode; and
    d) said buck power regulator capable of discharging a portion of excess current to circuit ground when an overvoltage resulting from a high output voltage causes the threshold voltage to rise to allow discharge of said portion of the excess current.

2. The SMPS of claim 1, wherein said active diode is an NMOS transistor.

3. The SMPS of claim 1, wherein said circuitry control the threshold voltage of the active diode is configured to discharge excess current proportional to an amount of overvoltage at the output of the buck power regulator.

4. The SMPS of claim 1, wherein the first comparison circuit is implemented by an amplifier a larger amount of excess current and overvoltage can be discharged to circuit ground.

5. The SMPS of claim 1, wherein said buck power regulator that triggers the second comparison circuit is capable of permitting an excess current to flow from the active diode to circuit ground when said overvoltage of the output voltage exceeds the target input voltage.

6. A method of overvoltage correction, comprising:
    a) providing a buck power regulator comprising a high-side PMOS pass transistor and a low side active diode, wherein the low-side active diode is capable of continuously varying its threshold voltage, a circuitry configured to control the threshold voltage of the active diode, comprising: a first comparison circuit configured to compare a voltage representing an output voltage of the buck converter with a reference voltage, wherein an output of the comparison circuit is connected to a first terminal of a circuit having resistance and to a first input of a second comparison circuit, said circuit having resistance, wherein a second terminal of the circuit having resistance is connected to ground, wherein a resistance of the circuit having resistance is capable of determining a threshold of the second comparison circuit permitting some of an excess current that has built up in the buck regulator to be conducted each cycle by the low-side active diode to Vss, or circuit ground, said second comparison circuit, configured to detect a zero crossing of a voltage of a node (LX) located between the PMOS pass transistor and the active diode, wherein a second input of the second comparison circuit is connected to the LX node and an output of the second comparison circuit is connected to a first input of a logic AND circuit, and said logic AND circuit capable of turning off the low-side active diode if the high side PMOS pass transistor is not being driven by a signal and a voltage change across the low-side active diode is detected by the second comparison circuit, wherein an output of the AND circuit is connected to a pate of the low-side active diode;
    b) comparing an output voltage of the regulator to a target input voltage;
    c) detecting an overvoltage; and
    d) raising, if required, the threshold voltage, which allows a greater negative current, discharging the over voltage, and discharging excess current in the buck power regulator.

7. the method of claim 6, wherein said active diode is an NMOS transistor.

8. The method of claim 6, wherein said excess current is discharged to circuit ground through the active diode.

9. The method of claim 6, wherein said overvoltage is a result of the output voltage exceeding the target input voltage of the buck power regulator, which triggers a zero crossing comparator and permits an excess current to flow from the active diode to circuit ground.

10. The method of claim 6, wherein said first comparison circuit is implemented by an amplifier, wherein excess current discharged is proportional to an amount of overvoltage at the output of the buck power regulator.

11. The method of claim 10, wherein a larger amount of excess current and overvoltage will be discharged to circuit ground by implementing the first comparison circuit by the amplifier.

* * * * *